United States Patent [19]
Froeschke

[11] Patent Number: 5,609,887
[45] Date of Patent: Mar. 11, 1997

[54] APPARATUS FOR PRODUCING GRANULAR MATERIAL INCLUDING A BELT FORMED OF ELASTICALLY JOINED LINKS

[75] Inventor: Reinhard Froeschke, Weinstadt-Beutelsbach, Germany

[73] Assignee: Santrade Ltd., Lucerne, Switzerland

[21] Appl. No.: 522,261

[22] PCT Filed: Jan. 5, 1995

[86] PCT No.: PCT/EP95/00038

§ 371 Date: Oct. 24, 1995

§ 102(e) Date: Oct. 24, 1995

[87] PCT Pub. No.: WO95/20433

PCT Pub. Date: Aug. 3, 1995

[30] Foreign Application Priority Data

Jan. 29, 1994 [DE] Germany .............. 44 02 722.2

[51] Int. Cl.[6] .................................................. B29C 47/30
[52] U.S. Cl. .......................... 425/6; 425/381; 425/382.3; 198/850
[58] Field of Search .......................... 222/415; 425/537, 425/381, 534, 382.3, 6; 198/850

[56] References Cited

U.S. PATENT DOCUMENTS 3,933,238 1/1976 Maguire ........................... 198/850
4,016,971 4/1977 Komossa et al. ................. 198/850
4,559,000 12/1985 Froeschke ........................... 425/6
5,185,163 2/1993 Wiatt et al. ........................ 425/534

FOREIGN PATENT DOCUMENTS 1327272 4/1963 France .
948598 9/1956 Germany .

*Primary Examiner*—Jay H. Woo
*Assistant Examiner*—Iurie A. Schwartz
*Attorney, Agent, or Firm*—Burns, Doane, Swecker & Mathis, L.L.P.

[57] ABSTRACT

Granular material is produced by discharging a viscous material from a vessel and onto a support surface on which the material solidifies. The vessel has first openings through which the material flows, and a belt travels across lower ends of the first openings, whereupon second openings of the belt periodically come into alignment with the first openings to permit a downward flow of the material. The belt comprises a plurality of links having long and short sides, with the long sides arranged parallel to one another and perpendicular to the direction of belt travel. Mutually facing long sides of adjacent links have undercut grooves which receive an elastic connector in the form of a pair of parallel rods received in the recesses and interconnected by springs.

9 Claims, 2 Drawing Sheets

Fig. 3
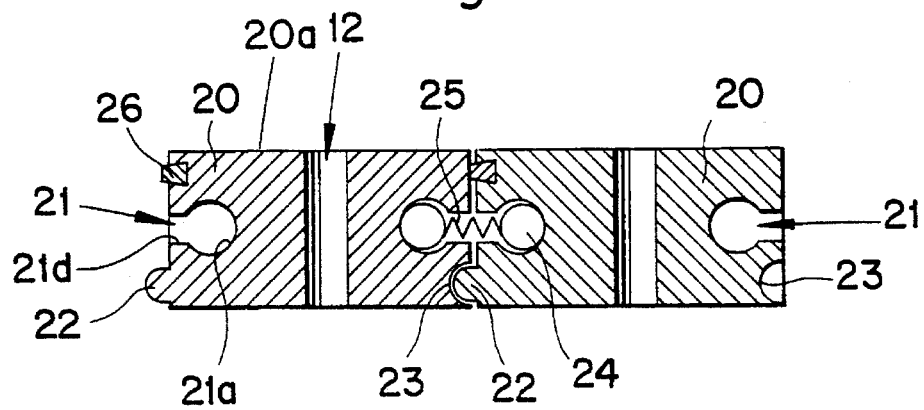
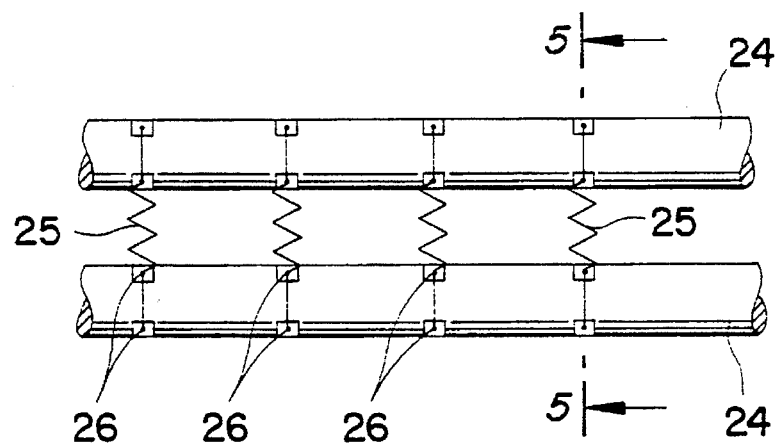
Fig. 4
Fig. 5
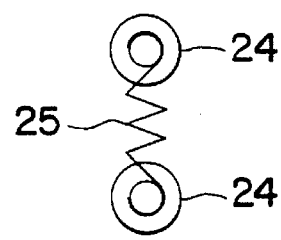

APPARATUS FOR PRODUCING GRANULAR MATERIAL INCLUDING A BELT FORMED OF ELASTICALLY JOINED LINKS

BACKGROUND OF THE INVENTION

The present invention relates to a device for producing granular material from free-flowing viscous masses which are transferred into the form of droplets and which then rigidify or gel, the apparatus comprising a vessel charged with the free-flowing mass and provided with discharge openings which, for the purpose of forming drops, are opened or closed intermittently by a perforated belt that is moved past the openings.

A device of this type has been known from Froeschke U.S. Pat. No. 4,559,000, where an endless, continuously moving belt is guided on two guide pulleys. In order to give the belt a sufficiently high elasticity for the continuous motion and for its application against the vessel, the belt is made from a plastic material, for example from PVC. Plastic belts are subject, however, to relatively significant wear and relatively rapid aging, and this may have the result that frequent belt changes, connected with production stoppages, have to be scheduled, or that after a longer operating time the belt will no longer apply itself against the discharge slot of the vessel so that its function may become unsatisfactory, unless the belt tension is continuously readjusted.

Now, it is the object of the present invention to provide a belt which is sturdy, exhibits almost no aging phenomena and which does not present the problems of elastically yielding belts.

SUMMARY OF THE INVENTION

By giving the belt the design according to a invention, comprising a plurality of lamellar links which are elastically joined and which, thus, are in close contact one with the other when passing the vessel, a belt having the desired properties is provided. On the one hand, the belt offers sufficiently high flexibility, which is necessary due to the relatively small dimensions of the guide pulleys of the devices mentioned at the outset. On the other hand, the individual lamellar links can be made thick enough so that the perforated openings offer a sufficiently great volume for the formation of droplets. The flexibility and elasticity of the link is determined by suitable selection of the elastic means. These properties of the belt are not impaired by the thickness of the links. being determined by the elastic means that are active between the individual links. It is for this same reason that the flexibility of the belt also does not depend on the selection of the material for the links. These may, therefore, consist of any particularly non-aging material, without the bending properties of the material having a decisive importance. If some part, for example a lamellar link, of the belt gets damaged, it will be sufficient to exchange only the defective link, which takes relatively little time, whereby unnecessarily long production stoppages can be avoided. The production of the belt is also facilitated insofar as the lamellar links and the means serving to connect the links can be produced as one piece in the form of sections, for being then cut off as necessary (i.e. according to the desired width of the belt) and provided with the openings.

From G 85 29 725 U1 it has been known to interconnect the individual slats of a shutter by elastic connection elements. The material of the elastic connection elements is selected in this case in such a way that the latter can be bonded or welded to the slats. However, such a shutter, which is intended to protect from burglary or sun radiation, has nothing in common with a device for producing granular material.

According to an advantageous further development of the invention, the lamellar links are provided, on their long sides, with undercut grooves extending substantially in a direction parallel to the longitudinal axis, which are held together by pairs of parallel rods that are interconnected by resilient elements and inserted into the undercut grooves of neighboring lamellar links. This provides an effective connection between the individual links. The rods can be produced in a simple way as stock material, and can then be cut to length as required. And they can be exchanged easily and rapidly, too. If only one or more of the resilient elements fail, only these have to be exchanged.

According to a further development of the invention, means for sealing the joint between the lamellar links are provided on the side of the perforated belt facing the vessel. One avoids in this way that portions of the free-flowing mass leaving the vessel may enter the joints between the lamellar links and impair the function of the belt.

According to another embodiment of the invention, it is advantageously provided that the sealing means are elastic. This guarantees that the joints between the lamellar links are sealed in any bending phase of the belt.

According to a particularly advantageous embodiment of the invention, means for aligning the lamellar links, that are effective between neighboring lamellar links, are provided on the side of the perforated belt opposite the vessel. One procures in this way that the lamellar links are centered and guided one relative to the other so that displacements of individual links in a direction vertical to the plane of the belt are avoided.

BRIEF DESCRIPTION OF THE DRAWING

The invention is illustrated in the drawing by way of one exemplary embodiment and will be described hereafter in more detail with reference to the drawing, in which:

FIG. 3 shows an enlarged cross-sectional view taken along line 3—3 of the perforated belt of the device according to in FIG. 2;

FIG. 4 shows a top view of a pair of rods interconnected by resilient elements; and FIG. 5 shows a sectional view taken along line 5—5 to FIG. 4.

DETAILED DESCRIPTION OF PREFERRED EMBODIMENT OF THE INVENTION

Figure 1:
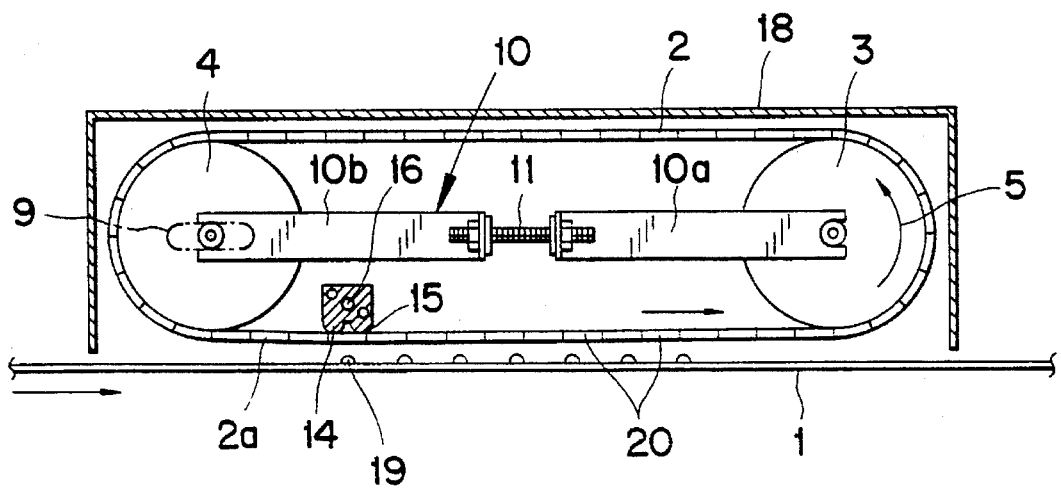
FIG. 1 shows a vertical sectional view through a device for producing granular material according to the invention.
Figure 2:
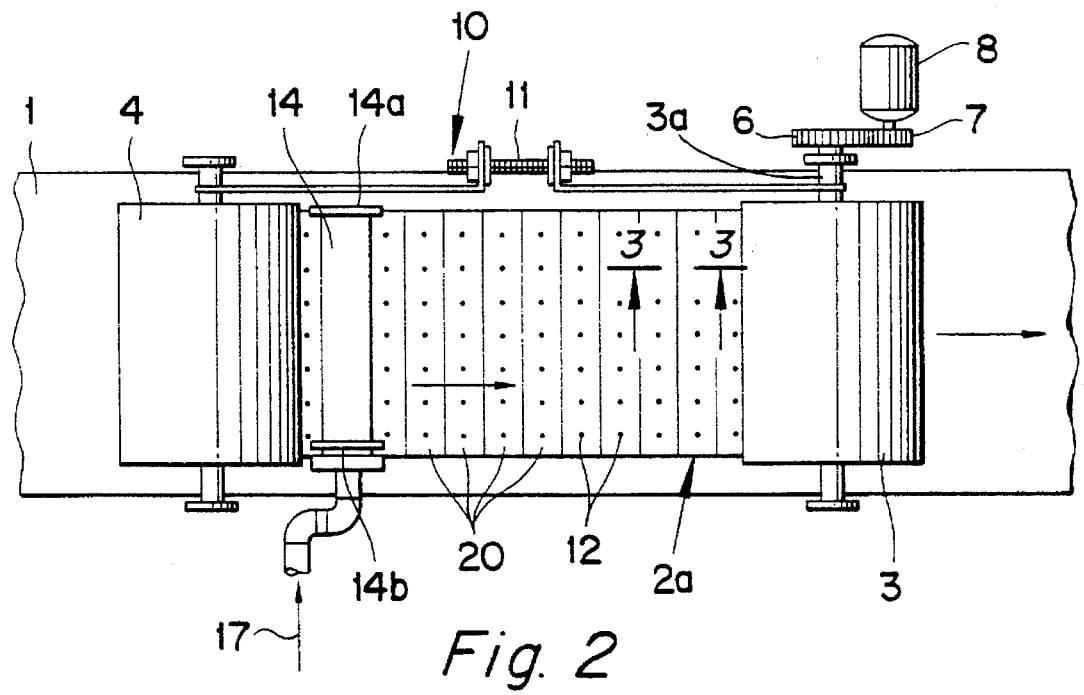
FIG. 2 shows a top plan view of the device according to FIG. 1.

FIGS. 1 and 2 show, above a conveyor belt (1), especially a steel belt designed as cooling belt, an endless continuously running belt (2) that is guided on two guide pulleys (3 and 4) which are supported—in a manner not shown in detail—in a frame above the conveyor belt (1). The guide pulley (3) is driven in the sense of arrow (5). FIG. 2 shows that this is achieved by the fact that the supporting shaft (3) of the guide pulley (3) is provided with a toothed wheel (6) that is driven via a pinion (7) and an electric motor (8). However, it would of course also be possible to use a chain or belt drive, especially a toothed belt drive.

The two guide pulleys (3 and 4) are supported in such a way that their mutual spacing can be adjusted to a given extent. The guide pulley (4) is held for this purpose in a longitudinal slot (9) indicated in FIG. 1 by broken lines. The spacing between the guide pulleys (3 and 4) can be adjusted via a spacer (10) comprising the two parts (10a and 10b) and being provided with a screw bolt (11). Spacers of this type are provided on both sides of the guide pulleys.

The continuously running belt (2), of which a detail of the lower flightor run (2a) is shown in FIG. 3, consists of a plurality of lamellar links (20) which—as shown in FIG. 3—are joined one to the other along their long sides, i.e., along their sides that extend parallel to their longitudinal axes. Since the belt (2) is composed of a plurality of links (20), it can be mounted on and guided by the guide pulleys (3 and 4) even if the latter have only small dimensions.

The long sides of the lamellar links are each provided with undercut grooves (21) extending in the longitudinal direction of the links and substantially over the entire length of each lamellar link (20). For connecting two neighboring lamellar links (20), pairs of parallel rods (24) are provided and interconnected by means of resilient elements (25) (compare FIG. 4). For connecting two lamellar links (20), the latter are placed with their long sides one beside the other, and are mutually aligned so that the undercut grooves (21) come to lie at the same level and form together a space of substantially dumb-bell-like cross-section. The undercut (21a) of the grooves (21) is substantially circular in shape and has a diameter slightly greater than the diameter of the parallel rods (24). Now a pair of rods (24), joined by resilient elements (25), is inserted into the hollow space formed by the undercut grooves (21). The reduced cross section of the groove adjacent the long side of the lamellar link (20) defines a narrow portion (21b) which extends from the circular portion (21a) and has the effect to confine each of the rods (24) in a direction perpendicular to its longitudinal axis so that the neighboring lamellar links (20) are indirectly connected via the resilient means (25) to permit the relative pivotal movement between adjacent links as they travel around the guide pulleys.

Each of the lamellar links (20) is provided with an opening (12) of—in the illustrated embodiment—circular cross-section. These openings (12) form the perforations of the assembled belt (2) to permit the viscous mass to flow therethrough. As appears from FIG. 1, the belt (2) is in contact with the curved outer surface of a tubular body (14) whose outer surface, facing the lower run (2a), is provided with a slot (15) that extends transversely to the longitudinal direction of the belt (2) and that is closed by the tightly fitting perforated belt (2), and periodically exposed by the latter's openings when a row of openings (12) is moved therepast.

The tubular body (14) comprises a guide channel (16) for the supply of a viscous and free-flowing mass that is fed into the system in free-flowing, especially heated condition, in the direction indicated by arrow (17). Bores extending from the guide channel (16) open into the slot (15) that takes the form of an open groove. If, therefore, the guide channel (16) is charged with the material to be formed into drops, the latter can drop into the slot (15) and from there through the openings (12) onto the conveyor belt (1), the latter designed as a cooling belt. The thickness of the lamellar links is selected in such a way that a sufficient volume is provided in the openings (12) for receiving a given quantity of the hot viscous mass arriving from the tubular body (14), and for discharging it thereafter in the form of drops onto the surface of the cooling belt (1) where it rigidifies in the form of small lentil-shaped bodies (19).

In order to maintain the temperature of the mass to be formed into drops on the way through the entire device, the tubular body (14) is heated in a manner not shown in detail. In addition, the entire device is closed by a hood (18). Deflectors (14a and 14b) in the form of radially projecting ribs serve to guide any product, that emerges from the tubular body 14, back onto the inner surface of the belt that contains the openings (12).

In order to prevent any portions of the mass emerging from the tubular body (14) from entering the joints between the individual lamellar links (20), means (26) for sealing these joints are provided on that side (20a) of the perforated belt (2) that faces the tubular body (14). In the case of the embodiment illustrated in FIG. 3, the sealing means (26) consist of elastic rubber strips extending substantially over the entire length of each lamellar link (20) and being arranged slightly below its upper edge, on its long side. The lamellar links (20) that are held together by the resilient means (25) compress the sealing strip between them so that no mass is permitted to enter the joint from the upper face. When the belt (2) passes around the guide pulleys (3, 4) the sealing strips present between the links (20) are still further compressed. It is, therefore, of advantage if the sealing strips are made from a material which is sufficiently elastic to expand again after it has passed the guide pulleys so as to ensure perfect sealing of the joint.

As can be further seen in FIG. 3, the long sides of the lamellar links (20) are provided, at portions thereof spaced remotely from of the perforated belt (2) opposite the tubular body (14), with means (22, 23) for aligning the lamellar links (20). In the illustrated embodiment, the aligning means (22, 23) consist of groove-and-tongue guides. At the lower edge of the long side of each of the lamellar links (20) there is provided a tongue (22) of semi-circular cross-section which extends substantially over the entire length of the lamellar link. At the lower edge of the opposite long side, a corresponding groove (23) of semi-circular cross-section is provided, which extends over the whole length of the lamellar links (20). Thus, when the lamellar links (20) are joined, the tongue (22) of the one link will engage the groove (23) of the neighboring link. The resulting limitation of the freedom of movement of the links (20), in a direction perpendicular to the plane of the belt, has the effect to align and guide the links, mainly when they pass the tubular body (14).

FIG. 5 shows one possibility of holding the rods (24) together by means of the resilient elements (25), which take the form of spiral springs in the case of the illustrated embodiment. The rods (24) comprise for this purpose circular recessed areas, all arranged at the same height and in equal spacings, into which the ends of each spiral spring can be introduced by bending them over. The individual resilient elements (25) can be additionally secured in the recessed areas (26) by gluing. Instead of using spiral springs it is, however, also possible to use rubber or plastic rings, provided these offer the necessary elasticity. The pairs of parallel rods (24), that have been introduced into the undercut grooves (21) of the lamellar links (20) may be secured in the links, at their end faces, by screws or plugs, or the like, that are not shown in detail.

What is claimed is:

1. Apparatus for producing granular material from a free-flowing viscous mass, comprising a vessel charged with the free-flowing mass and containing a first discharge opening arrangement through which the mass is discharged, a pair of guide pulleys disposed on opposite sides of said vessel, and an endless belt wrapped around said guide pulleys such that a section of said belt disposed between said guide pulleys is conducted across an underside of said first opening arrangement; said belt including a plurality of second opening arrangements spaced apart in a direction of belt travel and positioned to come successively into alignment with said first opening arrangement to enable the mass to flow therethrough to a support surface disposed beneath said belt upon which the mass solidifies; said belt comprising a plurality of links each having long and short sides, said links arranged with their long sides parallel to one another and extending perpendicular to the direction of belt travel; and connectors elastically interconnecting said long sides of adjacent links for permitting relative pivotal movement of adjacent links during travel around the guide pulleys.

2. The apparatus according to claim 1, wherein said long sides of each link include undercut grooves extending parallel to said long sides, each of said connectors comprising a pair of rods interconnected by resilient elements, said rods disposed in respective undercut grooves of adjacent links.

3. The apparatus according to claim 2, wherein each of said undercut grooves comprises a circular portion and a narrow portion extending from said circular portion to a respective long side, each of said rods being of circular cross section and disposed in a respective circular portion.

4. The apparatus according to claim 1, wherein said belt further includes sealing elements for sealing a space formed between adjacent links.

5. The apparatus according to claim 1, wherein each of said sealing elements comprises an elastic strip mounted in one link and engaging an adjacent link.

6. The apparatus according to claim 1, wherein adjacent links include alignment structure for aligning the adjacent links.

7. The apparatus according to claim 6, wherein the alignment structure comprises a tongue-and-groove structure formed in adjacent links.

8. The apparatus according to claim 8, wherein said tongues and grooves are of semi-circular cross section.

9. The apparatus according to claim 8, wherein each link has one said tongue formed in one of its long sides, and one said groove formed in its other long side.

* * * * *